No. 819,771. PATENTED MAY 8, 1906.
F. LANGE
WEEDER.
APPLICATION FILED SEPT. 9, 1905.
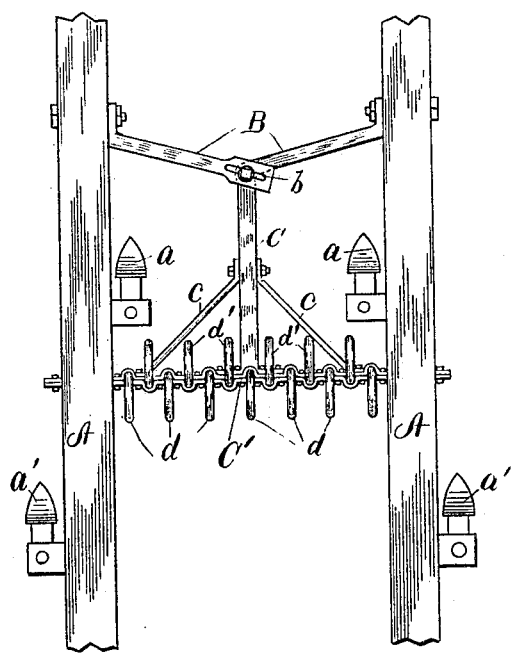
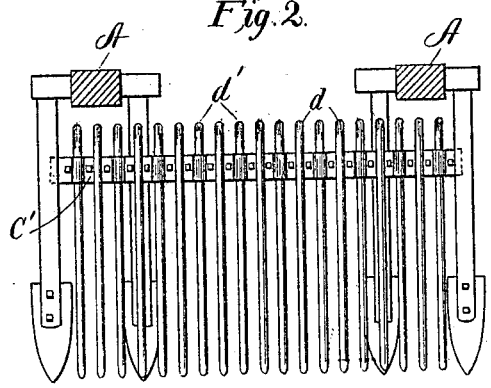
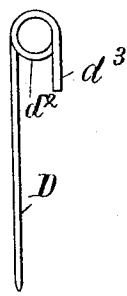
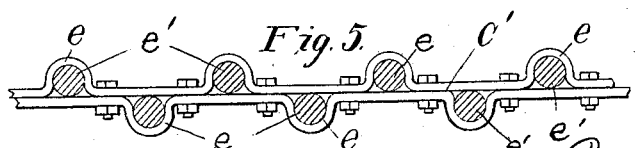
WITNESSES
Chas. F. Bassett
Benson Bidwell
INVENTOR
Fred Lange
Norman King
ATT'Y

UNITED STATES PATENT OFFICE.

FRED LANGE, OF OAKLAWN, ILLINOIS, ASSIGNOR OF ONE-THIRD TO HENRY KOELLER AND ONE-THIRD TO J. M. WEBER, OF CHICAGO, ILLINOIS.

WEEDER.

No. 819,771.  Specification of Letters Patent.  Patented May 8, 1906.

Application filed September 9, 1905. Serial No. 277,655.

*To all whom it may concern:*

Be it known that I, FRED LANGE, a citizen of the United States, residing at Oaklawn, Cook county, Illinois, have invented certain new and useful Improvements in Weeders, of which the following, taken in connection with the drawings, is a description.

My invention has for its object the production of a weeder which is so constructed that it is adapted to be attached for use to the beams of an ordinary shovel-cultivator, either a hand-cultivator or what is known as as a "sulky-cultivator." By the use of this weeder in connection with the cultivator the ground is first turned up and loosened by the shovels of the cultivator, when it can be carefully weeded around the plants while they are small without the necessity of some one going after the cultivator and removing the weeds left by the cultivator-shovels. By this means I have arranged a combination with a cultivator which is much more effectual in its operation than the weeding devices heretofore constructed by reason of its action upon the ground immediately after the same has been loosened by the shovels of the cultivator.

Other novel features and advantages of my invention will be hereinafter more fully pointed out in the following description.

The invention in this instance resides, primarily, in the simplicity of the combination and construction, arrangement, and adaptation of the different parts, which I have illustrated in what I now consider the preferred form of my invention in the accompanying drawings, forming part of this specification, and in which like letters of reference indicate corresponding parts, and in these drawings—

Figure 1 is a top plan view of my invention, illustrating one means of applying it to the beams of a shovel-cultivator. Fig. 2 is a rear elevation of the same. Fig. 3 is a side view of one of the teeth or tines of the weeding attachment. Fig. 4 is a modified form of construction of said tooth, and Fig. 5 is a top plan view of the cross arm or frame holding the teeth of the weeder.

In carrying out my invention, A A represent the beams, and $a$ $a'$ the shovels, of a cultivator which may be of any well-known construction. Secured to the beams A A, toward the forward ends thereof, are the braces B, which are adjustably held together, preferably by means of a bolt $b$. A center beam C is also held in position at its forward end by the bolt $b$. This center beam C extends to the rear of the forward shovels $a$. A cross-arm or tooth-supporting frame C', preferably of the construction shown in Fig. 5, is secured to the rear end of the center beam C' and is supported and held in proper position transversely across the frame of an ordinary cultivator by means of the braces $c$ $c$. The cross-arm or tooth-supporting frame C' is preferably constructed of two pieces of metal bolted together, as shown, and adapted to hold in staggered relation to each other the teeth or tines of the weeder $d$ $d'$. Each of the metallic pieces forming the cross-arm C' is provided at certain predetermined distances apart with a series of loop extensions $e$, which are adapted to fit over and around the teeth of the weeder.

In Fig. 3 I have shown a side elevation of one of the teeth $d$ or $d'$ used in the weeder. The downwardly-extending arms $e'$ of the teeth are secured in loop extensions $e$ of the cross-bar C'. When assembled, the teeth are disposed in practically vertical position and are arranged to project from opposite sides of the cross-arm C' in staggered relation to each other, as shown in Fig. 1. By this means when the weeder is in operation the teeth are close enough together to engage and remove any weeds coming in the path of the weeding attachment.

In Fig. 1 I have illustrated my weeding attachment as being applied in rear of the forward shovels $a$; but, as is obvious, I contemplate using them, if desired, at the rear of the rear shovels $a'$.

In Fig. 4 I have shown another form of tooth which may be used in case more resiliency is required than is afforded by the use of the teeth shown in Fig. 3. In this construction I have formed a coil $d^2$ in the upper end of said tooth. This tooth is also provided with a downwardly-extending arm $d^3$, by means of which it may be secured to the cross-arm C'.

The advantages of my invention will be apparent to those skilled in the art.

My improvements are exceedingly simple in construction, comprise the fewest possible parts, can be easily and cheaply manufactured and placed in position upon any cultivator-frame now on the market, and are effectual in all respects in the performance of their functions.

Slight changes might be made in the details of construction of my invention without departing from the spirit thereof or limiting its scope, and hence I do not wish to limit myself to the precise details of construction herein shown.

I claim—

1. In a weeder, the combination of a cultivator-frame, shovels secured to said frame, a tooth-supporting frame, said frame comprising two sections extending transversely across said cultivator-frame, and a plurality of downwardly-extending spring-teeth arranged in staggered relation to each other and supported between the sections of said frame, substantially as described.

2. A weeder comprising a two-piece cross-arm adapted to be secured to an ordinary cultivator-frame, loop extensions upon each side of said pieces, means for securing said pieces together with the loop extensions in staggered relation to each other upon each side of said cross-arm, and downwardly-extending spring-teeth one of which is held in each of said loop extensions, substantially as described.

In testimony whereof I have signed this specification in the presence of two subscribing witnesses.

FRED LANGE.

Witnesses:
MARTIN V. BARNEY,
ALBERT S. DEAN.